(12) United States Patent
Yu et al.

(10) Patent No.: US 11,321,227 B2
(45) Date of Patent: May 3, 2022

(54) BACKEND APPLICATION LOAD TESTING WITH RESPECT TO SESSION BETWEEN CLIENT APPLICATION AND SERVICE

(71) Applicant: MICRO FOCUS LLC, Santa Clara, CA (US)

(72) Inventors: Yan-Jun Yu, Shanghai (CN); Wei-Wei Zhang, Shanghai (CN); Dong-Xing Huang, Shanghai (CN)

(73) Assignee: MICRO FOCUS LLC, Santa Clara, CA (US)

( * ) Notice: Subject to any disclaimer, the term of this patent is extended or adjusted under 35 U.S.C. 154(b) by 62 days.

(21) Appl. No.: 16/802,875

(22) Filed: Feb. 27, 2020

(65) Prior Publication Data
US 2021/0271590 A1 Sep. 2, 2021

(51) Int. Cl.
G06F 11/36 (2006.01)
H04L 67/14 (2022.01)
H04L 67/01 (2022.01)
H04L 67/56 (2022.01)
G06V 40/20 (2022.01)

(52) U.S. Cl.
CPC ...... *G06F 11/3684* (2013.01); *G06F 11/3664* (2013.01); *G06F 11/3688* (2013.01); *H04L 67/14* (2013.01); *H04L 67/28* (2013.01); *H04L 67/42* (2013.01); *G06V 40/20* (2022.01)

(58) Field of Classification Search
CPC ............. G06F 11/3684; G06F 11/3664; G06F 11/3688
See application file for complete search history.

(56) References Cited

U.S. PATENT DOCUMENTS

| 2013/0004087 | A1* | 1/2013 | Kumar ................ G06F 11/3688 382/218 |
| 2015/0205713 | A1* | 7/2015 | Michelsen .......... G06F 11/3447 717/124 |
| 2016/0301732 | A1 | 10/2016 | Moretto et al. |
| 2017/0289008 | A1* | 10/2017 | Lau ...................... G06F 11/3457 |
| 2018/0089716 | A1 | 3/2018 | Xu et al. |

(Continued)

FOREIGN PATENT DOCUMENTS

WO    WO2015152698    10/2015

OTHER PUBLICATIONS

Bugaev, L., GoReplay <https://github.com/buger/goreplay>, accessed online Dec. 18, 2019, 4 pp.

(Continued)

*Primary Examiner* — Duy Khuong T Nguyen (57) ABSTRACT

Actions performed at a client application for a service during a session between the client application and the service. The client application runs on the client device and a service server hosts the service. Events received by a backend application running on a backend server from the service server during the session are also captured. The actions performed at the client application are correlated with the events received by the backend application from the service server. Backend application load testing data is generated. The backend application load testing data includes, for each action performed at the client application, the event received by the backend application from the service server that corresponds to the action.

20 Claims, 5 Drawing Sheets

(56) References Cited

U.S. PATENT DOCUMENTS

2018/0276111 A1* 9/2018 Datta .................. G06F 11/3696
2020/0133829 A1* 4/2020 Zazo .................. G06F 11/3692

OTHER PUBLICATIONS

"Load Testing", Dotcom-Monitor, Inc., 2019 <https://www.loadview-testing.com/load-testing/ >, 15 pp.

"Record and Playback Test Scripts in Minutes", SmartBear Software, 2019, <https://loadninja.com/features/record-and-playback/>, 3 pp.

Firsanov, K., "Social Network Authentication Load Testing with JMeter", Sep. 12, 2018, <https://www.blazemeter.com/blog/social-network-authentication-load-testing-with-jmeter/>.

Sh, G., "Testing Network Performance with Real Traffic", Quest Software Inc., Sep. 22, 2012, <https://www.quest.com/community/blogs/b/en/posts/testing-network-performance-with-real.

Jung, J.,"How to test software, part I: mocking, stubbing, and contract testing", Apr. 4, 2019, <circleci.com/blog/how-to-test-software-part-i-mocking-stubbing-and-contract-t.

* cited by examiner

(12) United States Patent

US 11,321,227 B2

BACKEND APPLICATION LOAD TESTING WITH RESPECT TO SESSION BETWEEN CLIENT APPLICATION AND SERVICE

BACKGROUND

Social networking services (SNSs) have proven immensely popular across the globe. A SNS is an online platform that people use to build social networks or social relationships with other people who share similar personal or career interests, activities, backgrounds or real-life connections. End users can access SNSs on a wide variety of computing devices, including mobile computing devices like smartphones and tablet computing devices, as well as more traditional computing devices such as desktop and laptop computers.

DETAILED DESCRIPTION

As noted in the background, social networking services (SNSs) are immensely popular ways by which people across the globe form social networks and relationships with other people. Commercial and other entities have thus established their own presence on SNSs as a way to engage with their customers, potential customers, and other SNS users. With the increasing presence of such entities on SNSs, the manner by which many users interact with them has shifted from direct access of the entities' own websites to access of their pages or other presence on SNSs. A significant percentage of network traffic with an entity's backend servers not uncommonly now originates from SNSs, rather than from the entity's websites or its own applications.

As also noted in the background, end users can access SNSs on a wide variety of computing devices, which can be considered client devices. Moreover, a significant if not the majority of end user interaction with a SNS occurs not via access of the SNS's website using web browsers running on the client devices, but via dedicated applications for the SNS that run on the client devices. For example, in the case of a mobile computing device like a smartphone, an end user may install an application, which is often referred to an app, for a SNS after download from a central application repository maintained by the manufacturer of the smartphone or the developer of the operating system running on the smartphone.

A backend server of an entity can run a backend application to support interaction with end users via SNSs as well as at the entity's website or its own applications. Such a backend application may support end user purchase of the entity's products and services, as well as provide a way by which end users can interact with the entity's technical and customer support, among other features and functionality. To ensure that a backend application can handle expected as well as unusual numbers of simultaneous end user sessions, the developers of the backend application usually perform load testing of the backend application. Load testing realistically simulates actual usage of the backend application, to verify that during subsequent real-world usage performance of the backend application is satisfactory.

However, accurate load testing of a backend application that receives a significant or a majority of its network traffic from SNSs, as opposed to directly from end users' own client devices, is difficult, particularly if the end users interact with the SNSs via client applications for the SNSs running on the client devices. Communication between such client applications and the SNSs as hosted by SNS servers is usually encrypted. Moreover, the protocol by which a client application for a SNS running on a client device interacts with the SNS may be "opaque" in that it is unpublished and otherwise unknown. The client application itself is also typically closed source, inhibiting the ability to "hook" into the application as a way to gain knowledge regarding usage of the SNS at the client application, which is an approach that could otherwise be used, for example, if the SNS were accessed using a web browser of the client device.

Techniques described herein ameliorate these and other difficulties to permit accurate backend application load testing with respect to sessions between client applications for a SNS and the SNS itself as hosted on a SNS sever. Actions performed at a client application for a service are novelly captured at the client device, such as an in image-based action recognition manner. Events transmitted by a service server hosting the service to a backend application running on a backend server are likewise novelly captured, such as via a reverse proxy server communicatively inserted between the service server and the backend server. The captured actions performed at the client application can be correlated with the captured events that the backend application correspondingly received from the third party server, to generate backend application load testing data.

To then perform load testing of the backend application, test scripts of actual sequences performed at the client application for the service can be played back in a scaled-up manner. A mock server stands in for the service server that actually hosts the service. As the mock server receives the actions, it looks them up within the previously generated backend application load testing data to identify their correlated events. The mock server transmits these events to the backend application, which receives them from the mock server no differently than it would from the service server that hosts the service. Load testing of the backend application can therefore be accurately conducted that mimics the events that the backend application receives from the service, as hosted by the service server, during actual end user usage of the client application for the service during sessions with the service.

Figure 1:
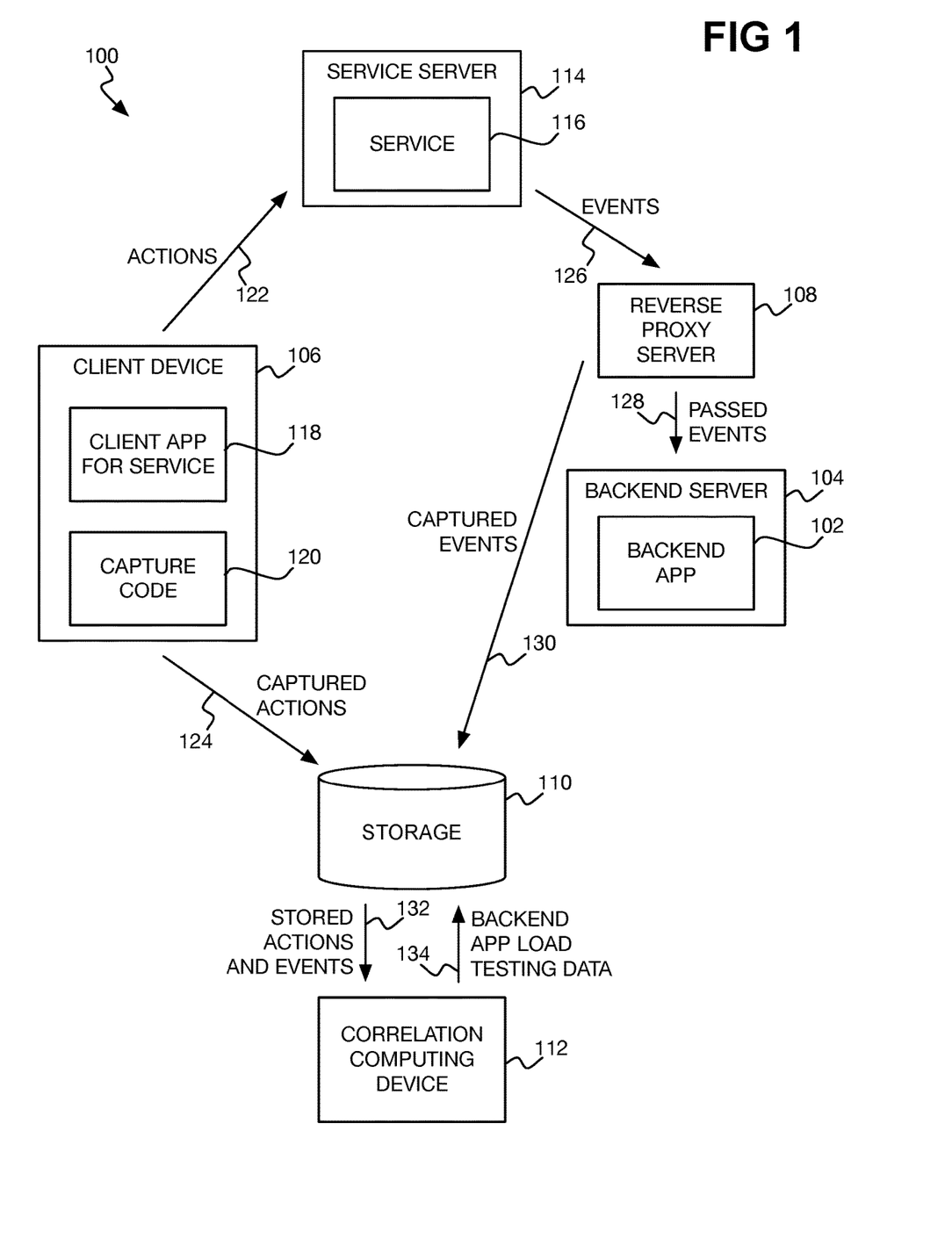
FIG. 1 is a diagram of an example system for generating backend application load testing data for subsequent load testing of a backend application running on a backend server, with respect to sessions between client applications for a service and the service as hosted by a service server.

FIG. 1 shows an example system 100 for generating backend application load testing data for a backend application 102. The system 100 includes a backend server 104 on which the backend application 102 runs. The system 100 includes a client device 106, and can further include a reverse proxy server 108 and a storage 110, as well as a correlation computing device 112. The system 100 generates backend application load testing data for subsequent load testing of the backend application 102 in the context of sessions between a service 116 hosted by a service server 114 and a client application 118 for the service 116 running on the client device 106.

The service 116 that the service server 114 hosts may be a third party service, including an SNS, a single sign-on (SSO) service, or another type of service. In the case of a third party service 116, the service server 114 may not be considered as part of the system 100, in that an entity other than that responsible for the backend server 104, the client device 106, the reverse proxy server 108, the storage 110, and the correlation computing device 112 controls the service server 114 and the service 116. In another implementation, the same entity may be responsible for or control the backend sever 104, the client device 106, the reverse proxy server 108, the storage 110, the correlation computing device 112, and the service server 114 hosting the service 116, in which case the service server 114 may be part of the system 100.

The backend application 102 running on the backend server 104 supports functionality that can be accessed during sessions of the service 116 at the client application 118 for the service 116. As one example, the entity controlling the backend server 104 running the backend application 102 may have a presence on the service 116 through which the entity sells products or services. The products or services can be purchased during sessions of the service 116 at the client application 118. Rather than accessing the entity's website directly to make such a purchase, a user may thus make the purchase at a page that the entity established with the service 116, via the client application 118 for the service 116. The backend application 102 may also support functionality that can be directly accessed at the backend server 104 by the client device 106, such as via a web browser running on the client device 106.

The client device 106 may, as one example, be a mobile computing device like a smartphone. The client application 118 may be an application that the provider of the service 116 developed and controls, which may be downloaded onto the client device 106 from a central application repository maintained by the manufacturer of the client device 106 or by the developer of the operating system running on the client device 106. The entity controlling the backend application 102 may therefore not have access to source code for the client application 118 or the manner (e.g., the protocol) by which the client application 118 communicates with the service 116.

The client device 106 runs or executes capture code 120 in addition to the client application 118 for the service 116. The capture code 120 captures actions 122 performed at the client application 118 during sessions with the service 116. How the capture code 120 can capture the actions 122 is described in detail later in the detailed description. The capture code 120 transmits the captured actions 124 for storing on a storage 110, which may be a storage device that stores the captured actions 124 as part of data, such as by using a database or in another manner.

The reverse proxy server 108 is communicatively situated between the service server 114 hosting the service 116 and the backend server 104 running the backend application 102. The reverse proxy server 108 therefore intercepts network traffic from the service server 114 intended for the backend server 104. Responsive to the actions 122 being performed at the client application 118 for the service 116 running on the client device 106, the service 116 may transmit events 126 intended for the backend application 102. The backend application 102 may have previously registered with the service 116 to receive such events 126, an example of which is described in more detail later in the detailed description.

The reverse proxy server 108 thus captures the events 126 from the service 116 hosted by the service server 114. The reverse proxy server 108 passes the events 126 as the passed events 128 to the backend application 102 running on the backend server 104 for processing no differently than if the backend application 102 received the events 126 directly from the service 116. The reverse proxy transmits the captured events 130 for storing on the storage 110 that also stores the captured actions 124 received from the capture code 120 running on the client device 106.

Therefore, in usage of the system 100, actual real world sessions between the client application 118 for the service 116 and the service 116 itself, as hosted by the service server 114, can be conducted. During these sessions, the capture code 120 also installed on the client device 106 captures the actions 122 performed at the client application 118 for the service. The reverse proxy server 108 captures the events 126 that that service 116 responsively transmits to the backend application 102. For example, a user may manipulate a number of graphical user interface (GUI) elements of the client application 118 to interact with the established presence of an entity on the service 116. Such actions 122 may culminate with the service 116 sending events 126 to the backend application 102 of the entity for processing.

After the sessions between the client application 118 for the service 116 and the service 116 hosted by the service server 114 have been conducted, the correlation computing device 112 retrieves the captured actions 124 and stored events 132 stored on the storage 110, as previously captured by the capture code 120 running on the client device 106 and by the reverse proxy server 108. The correlation computing device 112 correlates the actions 122 with the events 126. That is, for each action 122 performed at the client application 118 for the service 116 in interacting with the service 116, the correlation computing device 112 identifies the corresponding event 126 that the service 116 responsively sent to the backend application 102.

The correlation computing device 112 thus generates backend application load testing data 134 that it can store on the storage 110. The backend application load testing data 134 is made up of the captured actions 124 and the captured events 130, along with the identified correlations between the captured actions 124 and the captured events 130. How the correlation computing device 112 can correlate the captured actions 124 with the captured events 130 is described later in the detailed description. The correlation computing device 112 may be a server or other type of computing device, and is under the control of the entity responsible for the backend application 102.

Figure 2:
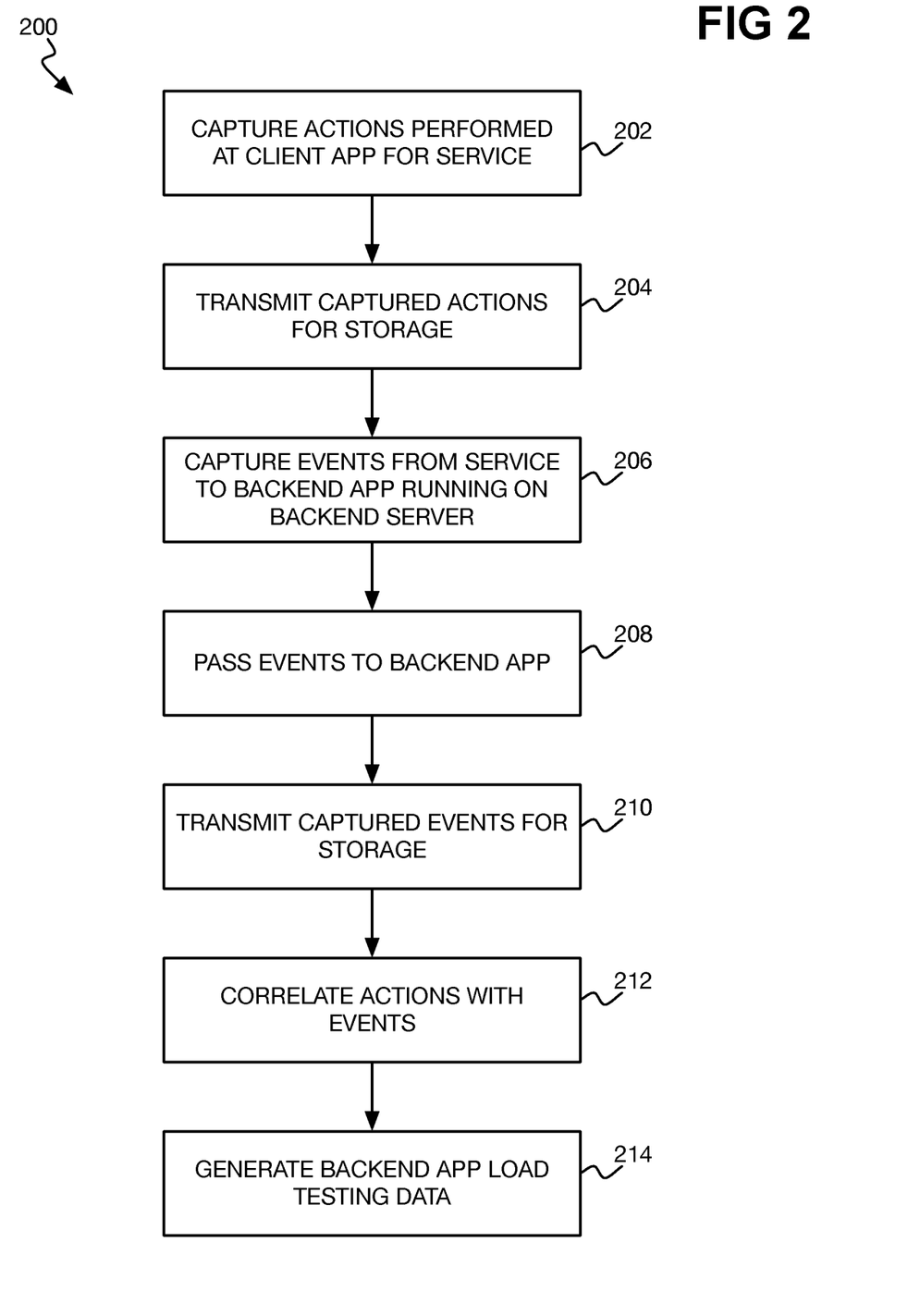
FIG. 2 is a flowchart of an example method for generating backend application load testing data for subsequent load testing of a backend application running on a backend server, with respect to sessions between client applications for a service and the service as hosted by a service server.

FIG. 2 shows an example method 200 for generating backend application load testing data 134 for the backend application 102 in the system 100. The method 200 is performed by the system 100. Some parts of the method 200 are performed by the capture code 120 running on the client device 106, some parts are performed by the reverse proxy server 108, and some parts are performed by the correlation computing device 112. The parts of the method 200 can be implemented as program code stored on non-transitory computer-readable data storage media, and accordingly executed by the client device 106, the reverse proxy server 108, and the correlation computing device 112.

The client device 106 captures actions 122 performed at the client application 118 for the service 116 during sessions between the client application 118 and the service 116 (202), and transmits the captured actions 124 for storage (204). More specifically, the capture code 120 running on the client device 106 captures the actions 122 and transmits the captured actions 124. The capture code 120 is separate from the client application 118 for the service 116. Therefore, the client application 118 does not have to be modified in any way, which may not be possible when the service 116 is not run by the entity of the backend application 102 for which the backend application load testing data 134 is to be generated.

Furthermore, the capture code 120 does not capture or intercept network traffic representing or including the actions 122 between the client application 118 running on the client device 106 and the service 116 hosted on the service server 114. Rather, the capture code 120 captures the actions 122 as they are performed on the client application 118 for the service 116. For example, the capture code 120 may capture the actions 122 in an image-based action recognition manner. This is particularly the case when the actions 122 are manipulations or interactions of GUI elements presented on the display of the client device 106 by the client application 118 for the service 116. Examples of such GUI elements include text boxes, selectable links, buttons, dropdown lists, and other types of actuatable controls.

For instance, the capture code 120 may be running in the background, monitoring the rendering of the client application 118 for display on the display of the client device 106. The capture code 120 can detect the GUI elements as the client application 118 renders and display the elements. The capture code 120 can likewise detect which GUI elements are actuated (i.e., selected) or otherwise manipulated by a user of the client device 106. In the case of a smartphone, the user may interact with the GUI elements via touching, tapping, pressing, and performing other touch-based actions on a touchscreen of the client device 106. The detection of the GUI elements presented by the client application 118 on the display of the client device 106 and the detection of user interaction with these GUI elements is referred to as an image-based action recognition manner.

Such an image-based action recognition manner can in one implementation include receiving events from the driver or other software for the touchscreen. The events can indicate the actions that the user has performed on the touchscreen, such as which part of the touchscreen has been selected. The events can then be correlated with the image displayed on the touchscreen to detect the user interaction with the GUI elements within the image being displayed. In another implementation, the image-based action recognition manner can include receiving events from GUI software running on the client device 106, which may be part of the operating system, where the events directly indicate which GUI elements being displayed have been selected or otherwise are the subject of user interaction.

There is therefore no need for the capture code 120 to monitor and decode the network traffic originating at the client device 106 and intended for the service 116, and which encapsulates these actions 122. This is beneficial, because as noted above the communication between the client device 106 and the service server 114 may be encrypted, and the protocol by which the actions 122 performed at the client application 118 for the service 116 may be otherwise unknown and not easily reverse engineered. By instead capturing the actions 122 as they are performed at the client application 118, on the client device 106 itself, the capture code 120 avoids this difficulty entirely. Further, that the client application 118 may be closed source or otherwise unreceptive to integration of action capture functionality does not matter since the capture code 120 is separate from the client application 118 on the client device 106.

The reverse proxy server 108 communicatively inserted between the service server 114 and the backend server 104 to intercept network traffic from the server 114 to the backend server 104 captures events 126 from the service 116 intended for the backend application 102 running on the backend server 104 (206). The service 116 may transmit the events 126 responsive to receiving communication regarding the actions 122 performed at the client application 118 that pertain to the page or other presence of the entity responsible for the backend application 102. The backend application 102 may have previously registered the events 126 that the service 116 is to generate and transmit to the backend application 102 responsive to the actions 122 being performed at the client application 118.

For instance, in one implementation, the events 126 may be webhooks, which are data sent to particular endpoints (e.g., network addresses like universal resource locator (URL) addresses), for different types of actions 122 being performed. Webhooks are software hooks, or functions, which are run when the actions 122 are performed, which work over a network like the Internet. A webhook may also be referred to as a web callback or a hypertext transport protocol (HTTP) push application programming interface (API). A webhook thus delivers data to an application like the backend application 102 when an action 122 is performed.

Because the reverse proxy server 108 is inserted in the communication path between the service server 114 and the backend server 104 by the entity that controls the backend application 102, the reverse proxy server 108 can thus detect the events 126 within the intercepted network traffic between the servers 114 and 104. This is the case even if the communication between the service server 114 and the backend server 104 is encrypted, such as via the HTTP secure (HTTPS) protocol, since the entity is the holder of or has access to the private key used to secure the network traffic in an asymmetrically cryptographic manner. The reverse proxy server 108 passes the events 128 to the backend application 102 for processing (208), and also transmits the captured events 130 for storage (210).

The actions 122 can be captured and transmitted in parts 202 and 204 of the method 200, and the events 126 captured, passed, and transmitted in parts 206, 208, and 210, as part of a session between the client application 118 and the service 116 that is desired to be subsequently played back for load testing of the backend application 102. Rather than having many testers concurrently and manually perform the same actions 122 at client applications 118 running on respective client devices 106 to assess whether the backend application 102 can properly process the corresponding events 126 received from the service 116, a session made up of such actions 122 has to be manually performed just once, by one tester. Then, multiple testing devices can simultaneously play back the actions 122 by running the same test script to load test the backend application 102, as described in detail later in the detailed description.

Once the session between the client application 118 for the service 116 and the service 116 has been completed, the correlation computing device 112 can correlate the stored actions and the stored events 132 (212). For each captured action 124, the correlation computing device 112 can identify the captured event 130 that the service 116 sent to the backend application 102 responsive to the action 122 having been performed. Along with the captured actions 124, timestamps indicating the times at which the captured actions 124 were performed may also be stored. Similarly, along with the captured events 130, timestamps indicating the times at which the captured events 130 were received may also be stored.

The correlation computing device 112 for each captured action 124 may thus identify the captured event 130 received by the backend application 102 (as captured by the reverse proxy server 108) from the service server 114 hosting the service 116 that corresponds to the captured action 124 in question. In one implementation, for a captured action 124 having a timestamp indicating the time at which the captured action 124 was performed, the correlation computing device 112 may identify the captured event 130 received by the backend application 102 at a time after and closest to when the captured action 124 was performed. Such identification can be performed by inspecting the timestamps of the captured events 130 in comparison to the timestamp of the captured action 124 in question.

For example, actions A, B, and C may respectively occur at times t1, t3, and t5, and the backend application 102 may respectively receive events 1, 2, and 3 at times t2, t4, and t6. Time t6 is later than time t5, which is later than time t4, which is later than time t3, which is later than time t2, which is later than time t1. Event 2 may thus be correlated with action B. This is because, of the three events 1, 2, and 3, event 2 was received at the time—time t4—which is closest to but after the time—time t3—when action B was performed. Even though time t6, when event 3 was received, is also after time t3, time t4 is closer to time t3 than time t6 is; event 3 is thus not correlated to action B. Even if time t2, when event 1 was received, happens to be closer to time t3 than time t4 is, time t2 is before time t3; event 1 thus cannot be correlated to action B.

Once the correlation computing device 112 has correlated the captured actions 124 with the captured events 130, such as in the manner that has been described, the correlation computing device 112 can generate the backend application load testing data 134 on which basis load testing of the backend application 102 can subsequently be performed (214). As noted above, the backend application load testing data 134 includes the stored actions and stored events 132 along with the identified correlations between them. For instance, the correlation computing device 112 may store this information in a database in relation to which a captured action 124 can be looked up to identify the captured event 130 with which it has been correlated. The captured event 130 correlated with the captured action 124 is the corresponding event 126 for the action 122.

Figure 3:
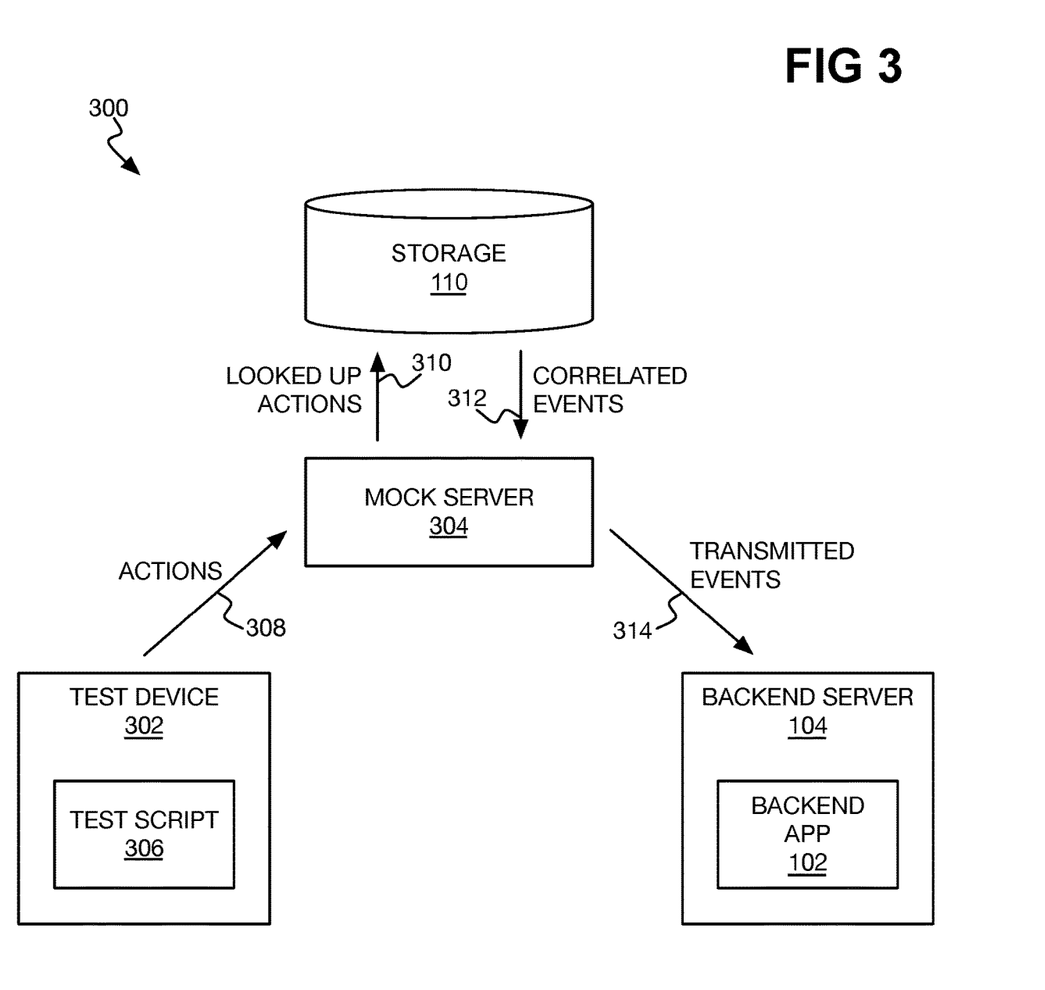
FIG. 3 is a diagram of an example system for load testing a backend application running on a backend server to simulate in a scaled-up manner real-world sessions between client applications for a service and the service as hosted by a service server, using previously generated backend application load testing device.

FIG. 3 shows an example system 300 for load testing the backend application 102 to simulate real-world sessions between client applications 118 for the service 116 hosted by the service server 114, like the client application 118 of FIG. 1, using previously generated backend application load testing data 134. The system 300 includes the backend server 104 on which the backend application 102 runs. The system 300 includes a test device 302 and a mock server 304, and can include the storage 110 on which the correlation computing device 112 of FIG. 1 previously stored backend application load testing data 134.

The test device 302 plays back a test script 306 for load testing the backend application 102 running on the backend server 104. The test device 302 can be one of a large number of such test devices that can concurrently run the same test script 306 or different test scripts for load testing the backend application 102. The test device 302 stands in for the client device 106, and by playing back the test script 306, mimics or simulates the client application 118 running on the client device 106. Because there can be a large number of test devices, simulation of real-world sessions between client applications 118 for the service 116 of FIG. 1 and the service 116 occurs in a scaled-up manner. The test device 302 may be a computing device, such as a desktop or laptop computer, a server, and so on.

The test script 306 can include a sequence of actions 308 that were performed at the client application 118 for the service 116 in FIG. 1 during a previously recorded session between the client application 118 and the service 116 in relation to which backend application load testing data 134 was generated. In playing back the test script 306, the test device 302 does not actually perform the actions 308 on a client application 118 for the service 116. Indeed, the test device 302 does not run a client application 118 for the service 116. Rather, the test device 302 just sends the actions 308 to the mock server 304 as specified by the test script 306 being played back, in their sequential order within the test script 306. The test script 306 may indicate a time at which each action 308 is to be sent to the mock server 304, such as by specifying the delay that should be waited between sending consecutive actions 308.

The mock server 304 stands in for the service 116 hosted on the service server 114 in FIG. 1. The mock server 304 is under control of the same entity that is responsible for the backend application 102 running on the backend server 104. In load testing of the backend application 102 in FIG. 3, the mock server 304 is used in lieu of the service server 114 hosting the service 116. This can be beneficial in situations in which the entity responsible for the backend application 102 does not also control or is responsible for the service 116. Load testing of the backend application 102 is thus performed without having to involve the service 116.

The mock server 304 mimics or simulates the service 116 hosted on the service server 114 in FIG. 1. However, the mock server 304 does not actually run the service 116 or a version thereof. Rather, upon receipt of an action 308, the mock server 304 looks up the action 310 within the storage 110 that stores the backend application load testing data 134 of FIG. 1, and retrieves the correlated event 312 that has been correlated with the looked up action 310 within the backend application load testing data 134. The mock server 304 transmits this event 314 to the backend application 102 running on the backend server 104. Therefore, as the mock server 304 receives actions 308 from the test device 302, the mock server 304 identifies and transmits their corresponding correlated events 314 to the backend application 102.

The backend application 102 receives the transmitted events 314 from the mock server 304 no differently than it would from the service 116 hosted by the service server 114 in FIG. 1. The backend application 102 processes the transmitted events 314 as if they were received from the service 116. In this way, load testing of the backend application 102 can be achieved without involving the service 116. Further, because a large number of test devices like the test device 302 can concurrently run test scripts like the test script 306, load testing of the backend application 102 can be performed in an automated manner and therefore easily scaled up. Actions 122 at client devices 106 within sessions at client applications 118 for the service 116 running on the devices and the service 116 do not have to be manually performed, yet load testing of the backend application 102 still reflects the events that the backend application 102 receives from the service 116 during such sessions.

Figure 4:
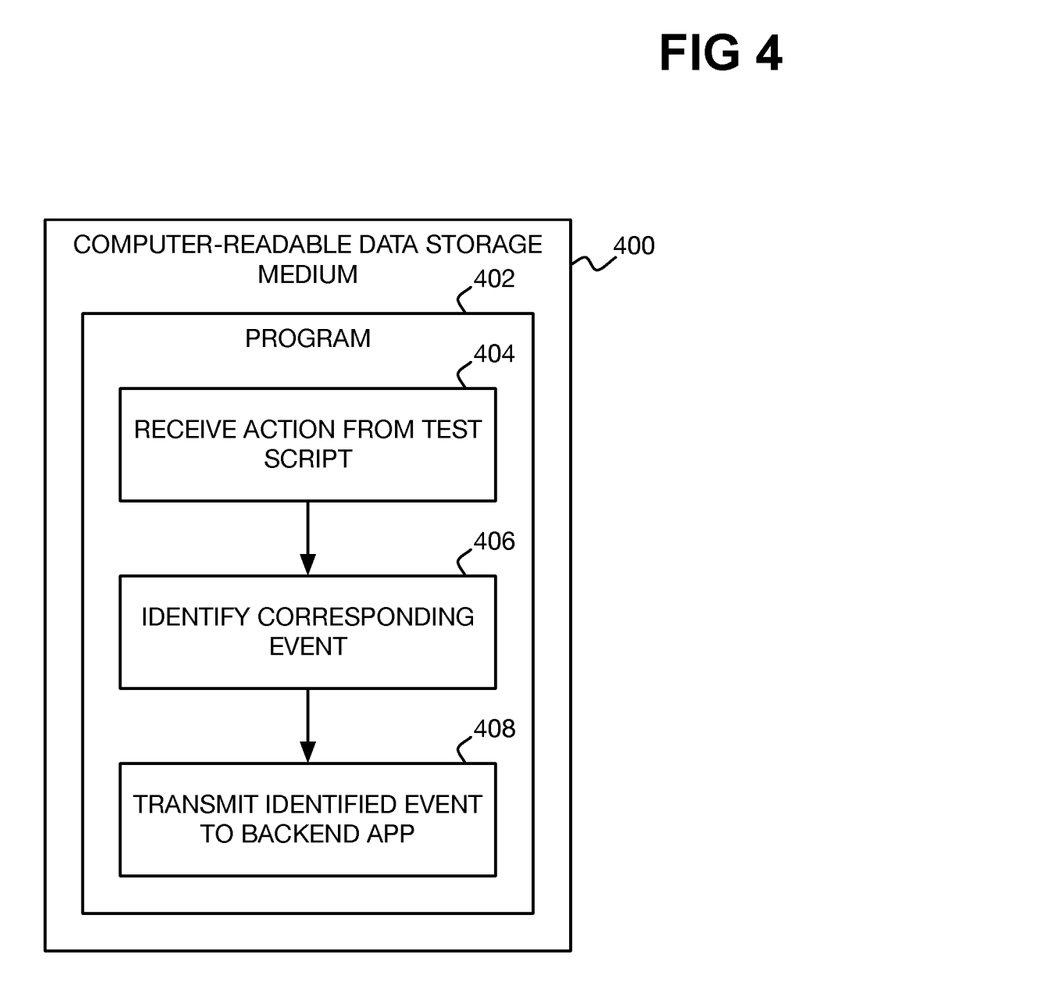
FIG. 4 is a diagram of an example computer-readable data storage medium storing program code for load testing a backend application running on a backend server to simulate in a scaled-up manner real-world sessions between client applications for a service and the service as hosted by a service server.

FIG. 4 shows an example non-transitory computer-readable data storage medium 400 that stores program code 402 for load testing the backend application 102 running on the backend server 104. The program code 402 is executed within the system 300, specifically by the mock server 304. The mock server 304 receives, from the test script 306 running on the test device 302, an action 308 (402). The action 308 is associated with a previously recorded session between the client application 118 for the service 116 and the service 116, which the test script 306 is playing back.

The mock server 304 identifies the correlated event 312 corresponding to the looked up action 310 (406). The correlated event 312 that corresponds to the looked up action 310 is the correlated event 312 that the backend application 102 running on the backend server 104 previously received from the service server 114 hosting the service 116 when the looked up action 310 was performed at the client application 118 for the service 116 during the previously recorded session. The mock server 304 then transmits the identified event 314 to the backend application 102 running on the backend server 104 (408), mimicking the service server 114 in load testing of the backend application 102.

The mock server 304 performs the program code 402 each time it receives an action 308 from a test script 306 that a test device 302 is playing back. For backend application load testing, large numbers of such test scripts 306 running on test devices 302 may be concurrently played back. The backend application 102 thus receives and processes transmitted events 314 from the mock server 304 no differently than it would from the service 116 itself in the context of sessions between the service 116 and client applications 118 for the service 116. Load testing of the backend application 102 therefore takes into account such transmitted events 314, yet does not involve client devices 106 running the client applications 118 for the service 116 nor the service 116 itself.

Figure 5:
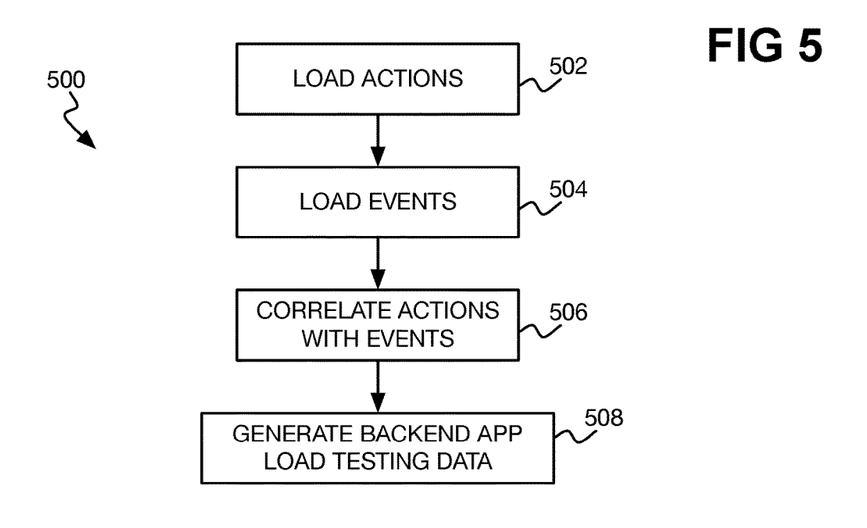
FIG. 5 is a flowchart of an example method.

FIG. 5 shows an example method 500. The method 500 can be performed by a computing device, such as the correlating computing device 112 of FIG. 1. The method 500 includes loading captured actions 124 performed at a client application 118 for a service 116 during a session between the client application 118 and the service 116 (502). The client application 118 runs on a client device 106, and the service 116 is hosted by a service server 114.

The method 500 includes loading captured events 130 received by a backend application 102 running on a backend server 104 from the service server 114 during the session (504), and correlating the captured actions 124 performed at the client application 118 with the captured events 130 received by the backend application 102 from the service server 114 (506). The method 500 includes generating backend application load testing data 134 (508). The backend application load testing data 134 includes, for each captured action 124 performed at the client application 118, the captured event 130 received by the backend application 102 from the service server 114 that corresponds to (e.g., has been correlated with) the captured action 124.

Figure 6:
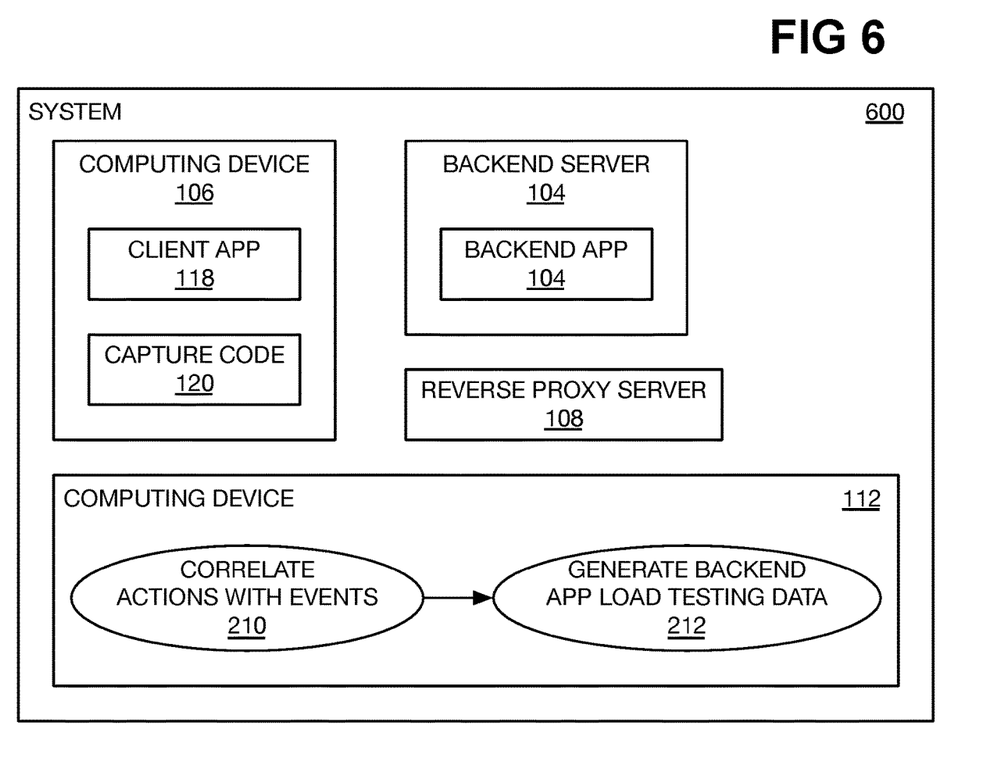
FIG. 6 is a diagram of an example system.

FIG. 6 shows an example system 600. The system 600 can include a client device 106 running a client application 118 for a service 116, and capture code 120 to capture actions 124 performed at the client application 118 during a session between the client application 118 and the service 116 as hosted by a service server 114. The system 600 can include a backend server 104 running a backend application 102 and a reverse proxy server 108. The reverse proxy server 108 intercepts network traffic between the service server 114 hosting the service 116 and the backend server 104, to capture events received by the backend application 102 from the service server 114 during the session.

The system 600 can include a correlation computing device 112. The correlation computing device 112 correlates the captured actions 124 performed at the client application 118 with the events received by the backend application 102 from the service server 114 (210). The correlation computing device 112 thus generates backend application load testing data 134 (212), which includes, for each action 122 performed at the client application 118, the event 126 received by the backend application 102 from the service server 114 that corresponds to the action 122. The system 600 may include other devices as well, such as the mock server 304 that has been described, which mimics the service server 114 in load testing of the backend application 102.

Techniques have been described for load testing a backend application 102 running on a backend server 104 in the context of sessions between a client application 118 for a service 116 and the service 116. Load testing of the backend application 102 can thus take into account the events that the backend application 102 receives during such sessions, without requiring the usage of the client application 118 or the service 116 itself once backend application load testing data 134 has been generated. Backend application load testing is therefore more accurate than if it did not take into account such events 126 received during sessions between the client application 118 and the service 116.

We claim:

1. A method comprising:
loading, by a processor, actions performed at a client application for a service during a session between the client application and the service, the client application running on a client device and inhibiting hooking into the client application to identify usage of the service at the client application, the service hosted by a service server;
loading, by the processor, events received by a backend application running on a backend server from the service server during the session;
correlating, by the processor, the actions performed at the client application with the events received by the backend application from the service server; and
generating, by the processor, backend application load testing data including, for each action performed at the client application, the event received by the backend application from the service server that corresponds to the action.

2. The method of claim 1, further comprising performing, by the processor, load testing of the backend application using the generated backend application load testing data.

3. The method of claim 1, further comprising:
receiving, by the processor, the actions performed at the client application and captured at the client device,
wherein interaction between the client application and the service occurs in an opaque, unpublished, encrypted, and unknown manner.

4. The method of claim 3, wherein the actions are captured in an image-based action recognition manner.

5. The method of claim 1, further comprising:
receiving, by the processor, the events transmitted by the service server, as captured at a reverse proxy server intercepting network traffic between the service server and the backend server prior to receipt by the backend application.

6. The method of claim 5, wherein the events comprise webhook data transmitted by the service server to webhooks previously registered by the backend application with the service hosted at the service server.

7. The method of claim 1, wherein correlating the actions comprises:
for each action, identifying the event received by the backend application from the service server after and closest to when the action was performed, as the event that corresponds to the action.

8. The method of claim 1, wherein the service is a social networking service (SNS) operated by a third party different than an entity of the backend server on which the backend application is running, the service server maintained by the third party and not under control of the entity.

9. The method of claim 1, wherein the service is a single sign-on (SSO) service,
and wherein the backend application is maintained by an entity that is to perform load testing of the backend application or for which the load testing is to be performed.

10. A non-transitory computer-readable data storage medium storing program code executable by a computing device to perform processing comprising:
receiving, from a test script playing back a previously recorded session between a client application for a service and the service as hosted by a service server, an action associated with and performed at the client application during the previously recorded session, the client application inhibiting hooking into the client application to identify usage of the service at the client application;
identifying an event corresponding to the action and that was previously received by a backend application running on a backend server from the service server during the previously recorded session; and
transmitting the identified event to the backend application running on the backend sever to mimic the service server in load testing of the backend application.

11. The non-transitory computer-readable data storage medium of claim 10, wherein identifying the event corresponding to the action comprises looking up the action within backend application load testing data including a plurality of actions captured during the previously recorded session.

12. The non-transitory computer-readable data storage medium of claim 11, wherein each action within the backend application load testing data has a corresponding event captured via a reverse proxy server intercepting network traffic between the service server and the backend server during the previously recorded session and received by the backend application from the service during the previously recorded session.

13. The non-transitory computer-readable data storage medium of claim 12, wherein the corresponding event of each action within the backend application load testing data comprises webhook data transmitted by the service server to a webhook previously registered by the backend application with the service hosted at the service server.

14. The non-transitory computer-readable data storage medium of claim 11, wherein the actions within the backend application load testing data were previously captured in an image-based action recognition manner at a client device running the client application for the service during the previously recorded session.

15. The non-transitory computer-readable data storage medium of claim 10, wherein the service is a social networking service (SNS) operated by a third party different than an entity of the backend server on which the backend application is running, the service server maintained by the third party and not under control of the entity.

16. A computing system comprising:
a correlation computing device comprising a processor and a non-transitory computer-readable data storage medium storing program code executable by the processor to:
correlate actions with events, the actions performed a client application for a service on a client device during a session between the client application and the service as hosted by a service server, the actions captured by capture code on the client device, the events sent by the service server to a backend application on a backend server during the session, the events captured by a reverse proxy server intercepting network traffic between the service server hosting the service and the backend server; and
generate backend application load testing data including, for each action performed at the client application, the event received by the backend application from the service server that corresponds to the action.

17. The system of claim 16, further comprising:
a mock server to mimic the service server in load testing of the backend application by receiving the actions from a test script playing back the session, identifying the events corresponding to the events from the backend application load testing data, and transmitting the identified events to the backend application running on the backend server.

18. The system of claim 16, wherein the actions are captured in an image-based action recognition manner.

19. The system of claim 16, wherein the events comprise webhook data transmitted by the service server to webhooks previously registered by the backend application with the service hosted at the service server.

20. The system of claim 16, wherein the service is a social networking service (SNS) operated by a third party different than an entity of the backend server on which the backend application is running, the service server maintained by the third party and not under control of the entity.

* * * * *